United States Patent [19]

Middleman et al.

[11] 4,238,812
[45] Dec. 9, 1980

[54] CIRCUIT PROTECTION DEVICES COMPRISING PTC ELEMENTS

[75] Inventors: Lee M. Middleman, Portola Valley; Joseph H. Evans; Donald F. Pettengill, both of Palo Alto, all of Calif.

[73] Assignee: Raychem Corporation, Menlo Park, Calif.

[21] Appl. No.: 965,344

[22] Filed: Dec. 1, 1978

[51] Int. Cl.³ .............................................. H02H 5/04
[52] U.S. Cl. ................................... 361/106; 219/505; 219/523; 338/22 R
[58] Field of Search .......................... 361/27, 58, 106; 338/22 R, 22 SD; 219/328, 330, 331, 505

[56] References Cited

U.S. PATENT DOCUMENTS

| | | | |
|---|---|---|---|
| 2,978,665 | 4/1961 | Vernet et al. | 338/223 |
| 3,187,164 | 6/1965 | Andrich | 361/106 X |
| 3,241,026 | 3/1966 | Andrich | 361/106 X |
| 3,243,753 | 3/1966 | Kohler | 219/505 X |
| 3,564,589 | 2/1971 | Arak | 219/331 |
| 4,101,862 | 7/1978 | Takagi et al. | 361/106 X |

OTHER PUBLICATIONS

"The PTC Resistor"-Blaha; Proceedings of The Electronic Components Conference, 1971.

*Primary Examiner*—Harry E. Moose, Jr.
*Attorney, Agent, or Firm*—Lyon & Lyon

[57] ABSTRACT

Circuit protection devices comprising PTC elements, and circuits containing such devices. The devices, which are particularly useful in circuits carrying a steady state current of 0.5 amp or more, can protect the circuit against excessive current, e.g. as a result of a short or a voltage surge, or against excessive temperature, or both. The PTC element is composed of a material, preferably a conductive polymer, having a resistivity less than 10 ohm. cm in the normal operating condition of the circuit, and the device comprises electrodes such that current flows through the PTC element over an area of equivalent diameter d with an average path length t such that d/t is at least 2. The circuit has a normal operating condition in which the device has a low resistance and is in stable thermal equilibrium with its surroundings; however, when a fault condition occurs, the device generates heat by $I^2R$ heating at a rate which exceeds the rate at which heat can be lost from the device, thus causing the temperature and resistance of the device to rise until the device reaches a new, high temperature, stable thermal equilibrium state. In order to ensure that the circuit current is reduced to a sufficiently low level, the ratio of (a) the power in the circuit in the normal operating condition to (b) the power in the circuit when the device is in the high temperature equilibrium state, is at least 10, preferably at least 40.

63 Claims, 8 Drawing Figures

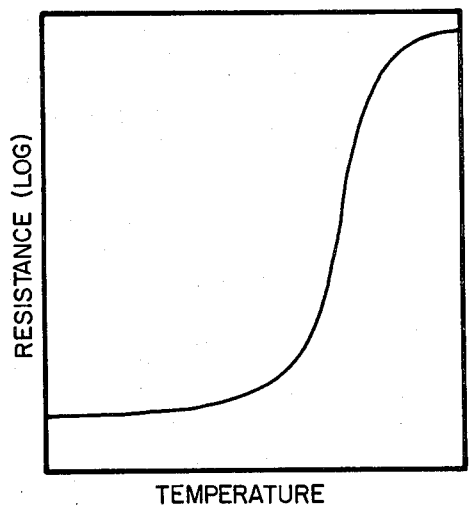
FIG__1
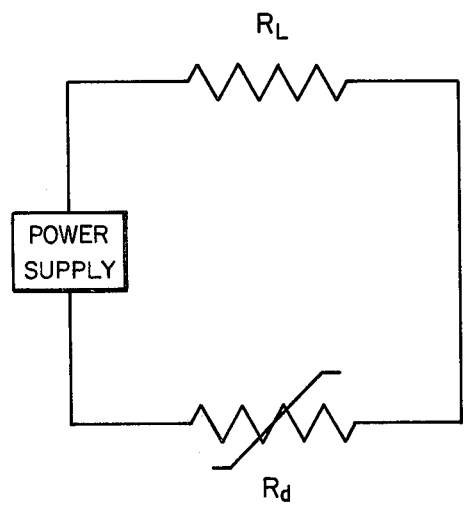
FIG__2
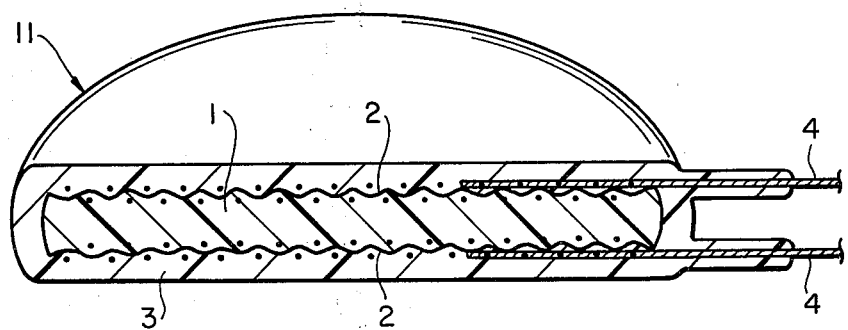
FIG__5
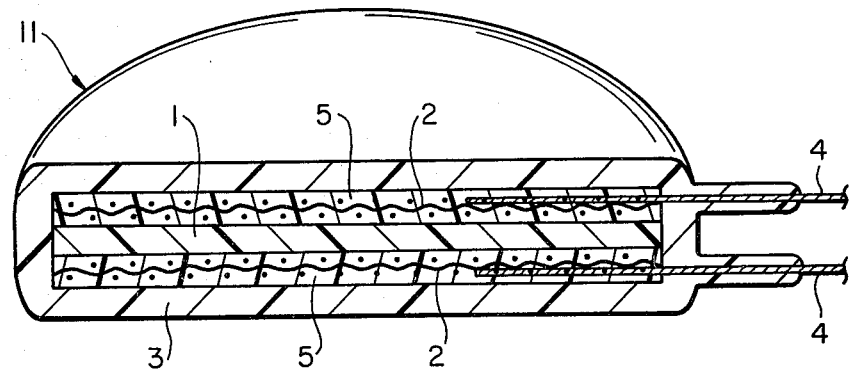
FIG__6

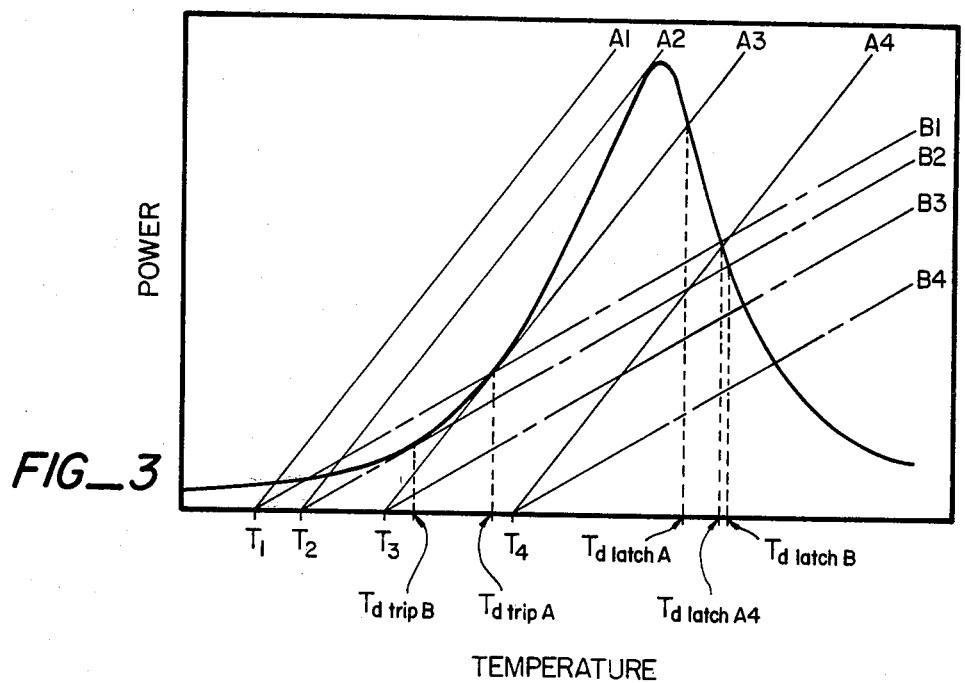
FIG_3
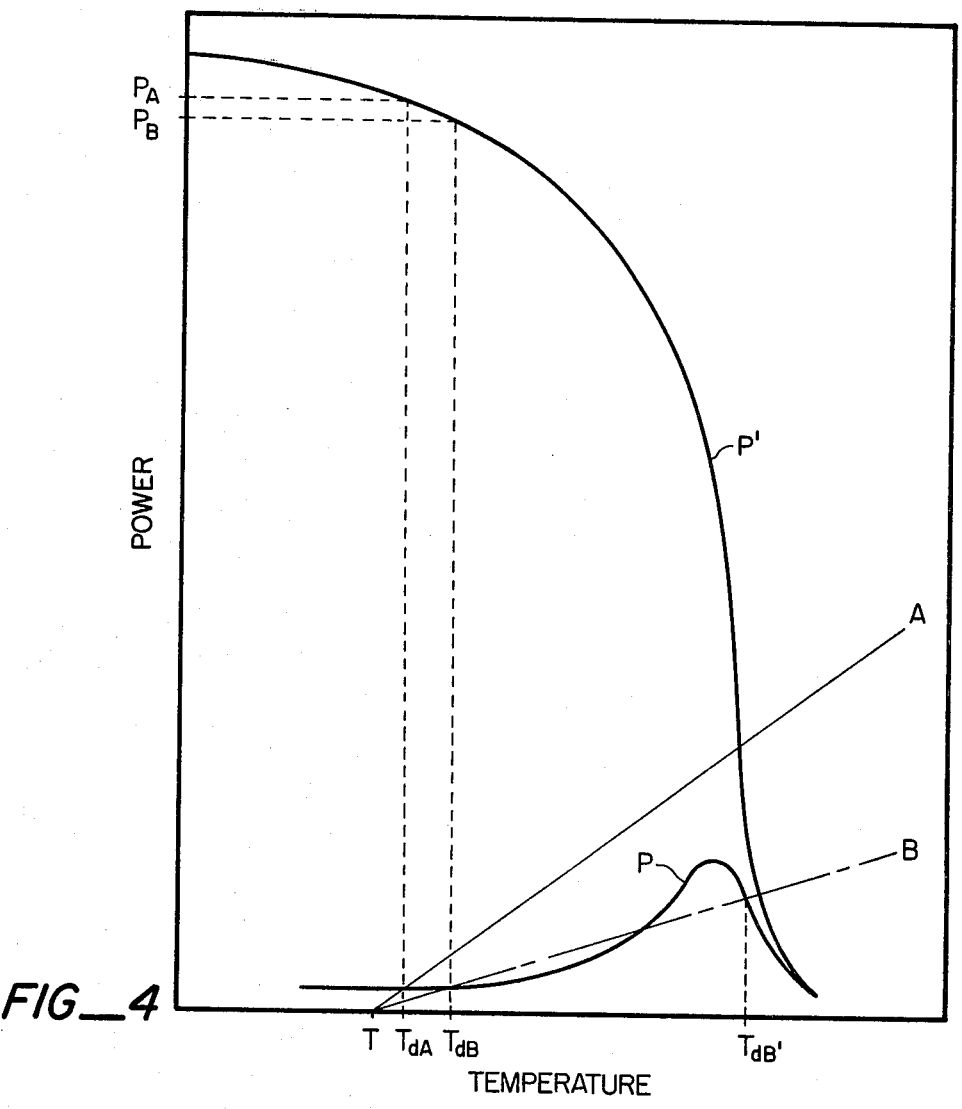
FIG_4

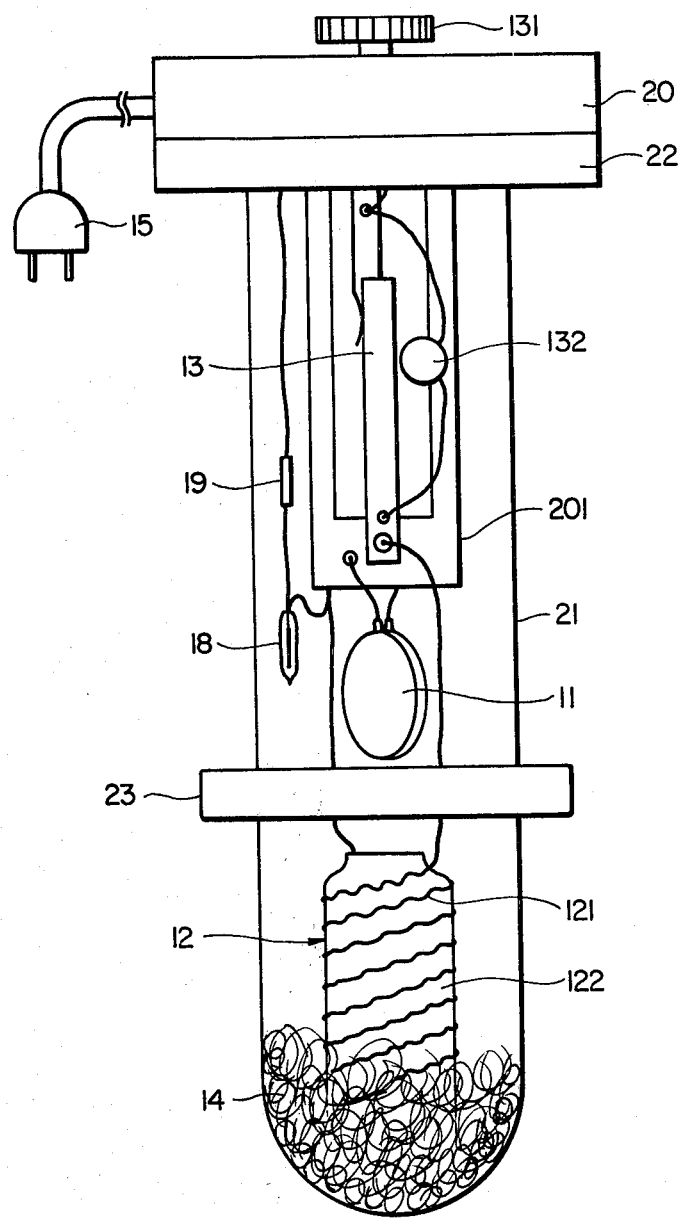
FIG_7
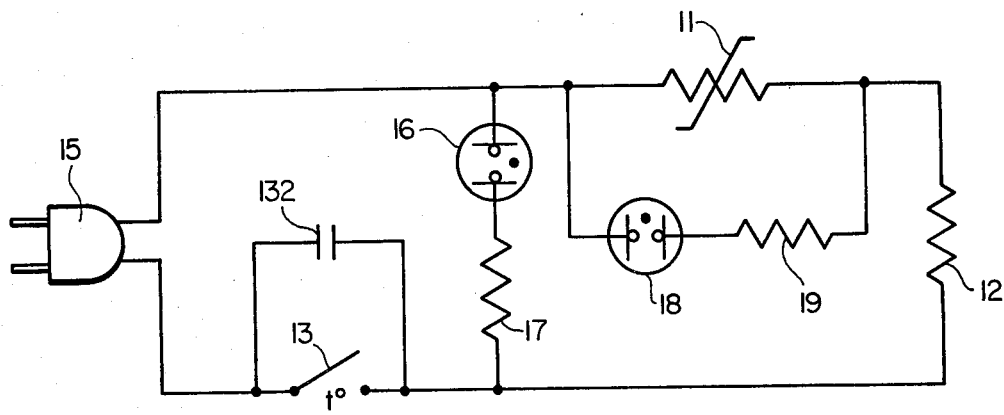
FIG_8

CIRCUIT PROTECTION DEVICES COMPRISING PTC ELEMENTS

CROSS REFERENCE TO RELATED APPLICATIONS

This application is related to the application of van Konynenburg et al entitled Low Resistivity PTC Compositions, application Ser. No. 965,343, filed Dec. 1, 1978 and to the application of Middleman et al. entitled PTC Devices Comprising Oxygen Barrier Layers, application Ser. No. 965,345, filed Dec. 1, 1978, now abandoned.

BACKGROUND OF THE INVENTION

1. Field of the Invention

This invention relates to circuit protection devices comprising elements composed of PTC material.

2. Summary of the Prior Art

It is well known that the resistivity of many conductive materials changes with temperature, and those which show a sharp increase in resistivity over a particular temperature range are frequently referred to as Positive Temperature Coefficient (PTC) materials. Examples of PTC materials are certain doped ceramics such as barium titanate, and certain conductive polymers, i.e. polymers having a particulate conductive filler dispersed therein. The ceramic PTC materials currently available have very stable electrical properties. On the other hand at relatively high voltage gradients, e.g. above 2 volts/mil, their resistivity tends to fall undesirably rapidly after reaching a peak; even more importantly, their minimum resistivity at 25° C. is relatively high, generally above 40 ohm. cm, so that they cannot be used in situations which require a combination of low resistance and small size. In addition they are brittle and difficult to shape. Conductive polymer PTC materials are generally comparatively flexible and easily shaped, and although until recently the range of physical and electrical properties available was limited, recent research has shown how conductive polymers having a much wider range of properties (and in particular low resistivities at lower temperatures combined with high resistivities at higher temperatures) can be prepared, and how improved devices containing conductive polymers can be made. Reference may be made, for example, to U.S. Pat. No. 3,858,144 and to copending and commonly assigned applications Ser. No. 601,638 (Horsma et al.), U.S. Pat. No. 4,177,376, now abandoned Ser. No. 750,149 (Kamath et al.) Ser. No. 751,095 (Toy et al.), now abandoned, Ser. No. 798,154 (Horsma), now abandoned and Ser. No. 873,676 (Horsma) and to application Ser. No. 965,343 of van Konynenburg et al entitled Low Resistivity PTC Compositions, filed Dec. 1, 1978, and the application of Middleman et al entitled PTC Devices Comprising Oxygen Barrier Layers, application Ser. No. 965,345, filed Dec. 1, 1978 now abandoned. The disclosures of this patent and these applications are incorporated by reference herein. PTC ceramic materials have been used in heaters and in circuit protection devices (see for example the article entitled "The PTC Resistor" by R. F. Blaha in Proceedings of the Electronic Components Conference, 1971). However, for circuits which carry a relatively high steady current, for example ½ amp or more, circuit protection devices based on PTC ceramic materials are (because of the high resistivity of such materials) unacceptably large in size. Conductive polymer PTC materials have been widely used in heaters. In addition, their use in circuit protection devices has been proposed in the literature, for example in U.S. Pat. Nos. 2,978,665 (Vernet et al.) and 3,243,753 (Kohler). However, in general there is no disclosure in the literature of any specific circuit protection device containing a conductive polymer PTC element which is even alleged to give satisfactory results, and our investigations have shown that where the literature indicates that specific circuit protection devices of this kind have in fact been made, the directions given are inadequate and misleading.

SUMMARY OF THE INVENTION

The object of this invention is to provide improved circuit protection devices which comprise a PTC element (i.e. an element composed of a PTC material) and which are capable of carrying relatively high currents even when they are of small size.

In one aspect the invention provides an electrical circuit which comprises (1) a source of electrical power;

(2) a circuit protection device comprising at least two electrodes and a PTC element composed of a PTC composition having a switching temperature $T_s$; and (3) other circuit elements which are connected in series with said PTC element and which have an impedance $R_L$ ohms;

said electrical circuit having a normal operating condition in which (A) current flows through said PTC element over an area of equivalent diameter d with an average path length t such that d/t is at least 2;

(B) said device is at a temperature $T_{dn}$ at which the device has a resistance $R_{dn}$ which is (a) less than 1 ohm; and (b) less than $0.1 \times R_L$ ohm, and at which said PTC composition has a resistivity of less than 10 ohm. cm.;

(C) said device is in contact with a medium which is at a temperature $T_n$; and (D) there is a stable equilibrium between the rate at which the device generates heat by $I^2R$ heating and the rate at which heat is lost from the device;

and said device having an electrical power/temperature relationship and being capable of losing heat to said medium at a rate such that (a) if said medium is heated slowly from $T_n$ while maintaining $R_L$ and the voltage of the source of electrical power substantially constant, the temperature of the device increases slowly until the equilibrium between the rate at which the device generates heat by $I^2R$ heating and the rate at which heat is lost from the device becomes unstable, at which unstable equilibrium point the medium is at a temperature $T_{crit}$, the device is at a temperature $T_{d\ trip}$ and has a resistance $R_{d\ trip}$, and the rate at which the resistance of the device changes with temperature, $dR_{d\ trip}/dT_{d\ trip}$ is positive; and (b) if said medium is then heated just above $T_{crit}$, the rate at which the device generates heat by $I^2R$ heating exceeds the rate at which heat can be lost from the device and thus causes the temperature and the resistance of the device to rise rapidly and the circuit current to fall until a high temperature stable equilibrium point is reached at which the rate at which the device generates heat by $I^2R$ heating is equal to the rate at which heat is lost from the device; at which high temperature stable equilibrium point, the device is at a temperature $T_{d\ latch}$ and has a resistance $R_{d\ latch}$ which is such that the ratio of the power in the circuit in the normal operating condition to the power in the circuit at said high temperature stable equilibrium point, the Switching Ratio, is at least 10.

In its second aspect the invention provides an electrical circuit which comprises (1) a source of electrical power;

(2) a circuit protection device comprising at least two electrodes and a PTC element composed of a PTC composition having a switching temperature $T_s$; and (3) other circuit elements which are connected in series with said PTC element and which have an impedance $R_L$ ohms;

said electrical circuit having a normal operating condition in which (A) a current $i_n$ flows through said PTC element over an area of equivalent diameter d with an path length t such that d/t is at least 2;

(B) said device is at a temperature $T_{dn}$ at which the device has a resistance $R_{dn}$ which is (a) less than 1 ohm; and (b) less than $0.1 \times R_L$ ohm, and at which said PTC composition has a resistivity of less than 10 ohm. cm.;

(C) said device is in contact with a medium which is at a temperature $T_n$; and (D) there is a stable equilibrium between the rate at which the device generates heat by $I^2R$ heating and the rate at which heat is lost from the device;

and said device having an electrical power/temperature relationship and being capable of losing heat to said medium at a rate such that (a) if elements of the circuit are changed so that the current flowing through said device increases slowly from $i_n$ while maintaining $T_n$ substantially constant, the temperature of the device increases slowly until the equilibrium between the rate at which the device generates heat by $I^2R$ heating and the rate at which heat is lost from the device becomes unstable, at which unstable equilibrium point the current is at a value $i_{crit}$ and the rate at which the resistance of the device changes with temperature is positive; and (b) if elements of the electrical circuit are further changed so that the current flowing through said device increases to $2 \times i_{crit}$, while maintaining $T_n$ substantially constant, the rate at which the device generates heat by $I^2R$ heating exceeds the rate at which heat can be lost from the device and thus causes the temperature and the resistance of the device to rise rapidly and the circuit current to fall until a high temperature stable equilibrium point is reached at which the rate at which the device generates heat by $I^2R$ heating is equal to the rate at which heat is lost from the device; at which high temperature stable equilibrium point, the device has a resistance such that the ratio of the power in the circuit in the normal operating condition to the power in the circuit at said high temperature stable equilibrium point, the Switching Ratio, is at least 10.

It will be noted that in the circuits defined above, the circuit protection device is defined by reference to the other circuit elements, the medium around the device and the rate at which heat can be lost from the device to that medium. However, a circuit protection device which is useful for many purposes can be defined by reference to the way in which it will behave when placed in a standard circuit and in a standard thermal environment. Accordingly, in its third aspect the invention provides a circuit protection device which comprises a PTC element composed of a PTC composition having a switching temperature $T_s$ and at least two electrodes which can be connected to a source of electrical power and which, when so connected, cause current to flow through said PTC element; said device being such that a test circuit which consists of said device, a source of power having a voltage selected from 10 volts and 100 volts and a resistor of selected resistance in series with said device, said device being in still air and said resistance being selected so that when the still air is at 25° C. there is an unstable equilibrium between the rate at which the device generates heat by $I^2R$ heating and the rate at which heat is lost from the device, has a stable operating condition in which (A) current flows through said PTC element over an area of equivalent diameter d with an average path length t such that d/t is at least 2;

(B) said device is at a temperature $T_{dn}$ at which the device has a resistance $R_{dn}$ less than 1 ohm and at which said PTC composition has a resistivity of less than 10 ohm. cm.;

(C) the air is at a temperature $T_n$ which is less than 25° C.; and (D) there is a stable equilibrium between the rate at which the device generates heat by $I^2R$ heating and the rate at which heat is lost from the device;

and said device in said test circuit having an electrical power/temperature relationship and being capable of losing heat to the air at a rate such that (a) if the air is heated slowly from $T_n$ while maintaining said resistor and said source of power substantially constant, the temperature of the device increases slowly until the equilibrium between the rate at which the device generates heat by $I^2R$ heating and the rate at which heat is lost from the device becomes unstable, at which unstable equilibrium point the air is at a temperature of 25° C., the device is at a temperature $T_{d\ trip}$ and has a resistance $R_{d\ trip}$ and the rate at which the resistance of the device changes with temperature, $dR_{d\ trip}/dT_{d\ trip}$ is positive; and (b) if the air is then heated just above 25° C., the rate at which the device generates heat by $I^2R$ heating exceeds the rate at which heat can be lost from the device and thus causes the temperature and the resistance of the device to rise rapidly and the circuit current to fall until a high temperature stable equilibrium point is reached at which the rate at which the device generates heat by $I^2R$ heating is equal to the rate at which heat is lost from the device; at which high temperature stable equilibrium point, the device is at a temperature $T_{d\ latch}$ and has a resistance $R_{d\ latch}$ which is such that the ratio of the power in the circuit in the stable operating condition to the power in the circuit at said high temperature stable equilibrium point, the Switching Ratio, is at least 10.

The selection of the resistance of the resistor to be used in the above test circuit can most readily be made by placing the device in still air at 25° C., connecting the device to a variable voltage source, and making a plot of the equilibrium current against voltage for the device; the plot will have a peak which defines the maximum steady state current which the device can pass ($I_{max}$); the selected resistance will then be the voltage of the power source in the test circuit (i.e. 10 volts or 100 volts) divided by $I_{max}$. Many devices will meet the test criteria set out above when the voltage in the test circuit is 10 volts and when it is 100 volts, but the invention also includes devices which do so only at one of the voltages and not at the other.

BRIEF DESCRIPTION OF THE DRAWINGS

The invention is illustrated in the accompanying drawings, in which

FIG. 1 shows the resistance/temperature relationship of a typical PTC element;

FIG. 2 shows a typical circuit of the invention;

FIGS. 3 and 4 show power/temperature relationships for a typical protection device of the invention;

FIGS. 5 and 6 show typical devices of the invention;

FIG. 7 shows an aquarium heater in which the circuit includes a protection device as shown in FIG. 5; and FIG. 8 is a circuit diagram for the aquarium heater of FIG. 7.

DETAILED DESCRIPTION OF THE INVENTION

The invention is described herein mainly by reference to circuits containing a single PTC circuit protection device, but it is to be understood that the invention includes circuits which contain two or more such devices which can be tripped by different fault conditions and that the term circuit protection device is used to include two or more electrical devices connected in parallel and/or in series which together provide the desired protective effect. It is also to be noted that the invention includes circuits and devices as defined above, even if the circuit or device did not at one time meet all the specified requirements, for example when the electrical characteristics of the device as initially produced are unsatisfactory, but a subsequent aging treatment brings the device within the definition given above.

In the new circuit protection devices the electrodes and the PTC element are arranged so that the current flows through the element over an area of equivalent diameter d with an average path length t such that d/t is at least 2, preferably at least 10, especially at least 20. The term "equivalent diameter" means the diameter of a circle having the same area as the area over which the current flows; this area may be of any shape but for ease of manufacture of the device is generally circular or rectangular. It is generally preferred to use two planar electrodes of the same area which are placed opposite to each other on either side of a flat PTC element of constant thickness. However, other arrangements are possible to meet particular spatial or electrical requirements, for example more than two electrodes, more than one PTC element, a wedge-shaped PTC element or curved laminar electrodes with a curved laminar PTC element of constant thickness between them. In such other arrangements, the way in which the d/t ratio should be calculated will be apparent to those skilled in the art.

The PTC element will generally be of uniform composition but may for example comprise two or more layers having different resistivities and/or different switching temperatures. The electrodes may be in direct contact with the PTC element or one or more of them may be electrically connected thereto through another conductive material, e.g. a layer of a relatively constant wattage conductive polymer composition. In preparing the device, care should be taken to avoid excessive contact resistance between the components of the device.

The electrodes will generally be of very low resistivity material, e.g. less than $10^{-4}$ ohm. cm, and of a thickness such that they do not generate significant amounts of heat during operation of the device. Typically the electrodes are of metal, nickel electrodes or nickel-plated electrodes being preferred. In order to improve adhesion and reduce contact resistance, the electrodes preferably have apertures therein, the apertures being small enough, however, for the electrode to provide a substantially equipotential surface over its whole area. Thus expanded metal mesh or welded wire mesh electrodes are preferred, the mesh preferably having from 50% to 80% open area with each aperture being from less than 0.02, preferably 0.01 to 0.002, square inch, in which case the area over which current flows into the PTC element can be generally regarded as the gross area of the electrode, ignoring the apertures therein.

The PTC element is composed of a material which has a resistivity at the normal operating condition of the circuit of less than 10 ohm. cm, with resistivities less than 7 ohm. cm, preferably less than 5 ohm. cm, particularly less than 3 ohm. cm, especially less than 1 ohm. cm, being preferred. In the normal operating condition for most circuits, the temperature of the device, $T_{dn}$, will be above 25° C., and the resistivity of the PTC element at 25° C. will be less than 10, generally less than 7, preferably less than 5, particularly less than 3, especially less than 1 ohm. cm. Preferred PTC compositions are conductive polymers, the conductive filler therein preferably comprising a conductive carbon black. Particularly useful PTC compositions are those disclosed in the application of van Konyenberg et al, Ser. No. 965,343, referred to above. The thinner the PTC element, the greater the voltage stress that it will have to withstand. It is, therefore, preferred that the PTC material should be able to withstand a voltage stress of at least 50 volts/millimetre, especially at least 200 volts/millimetre, in the high temperature stable equilibrium condition, and that the PTC element should be at least 0.02 inch thick.

The resistance of the device at the normal operating condition of the circuit, referred to herein as $R_{dn}$, which in the simple case of a device comprising two metal electrodes in contact with the PTC element, will be primarily determined by the resistance of the PTC element, is less than 1 ohm., preferably less than 0.2 ohm, especially less than 0.01 ohm. Having regard to the above, the PTC element will generally have a thickness of 0.02 to 0.4 inch, preferably 0.04 to 0.2 inch, and an equivalent diameter of 0.25 to 2 inch, preferably, 0.6 to 1.3 inch, though substantially greater thicknesses and/or equivalent diameters can be used. It is also necessary that, in the circuit in which the device is employed, $R_{dn}$ is less than $0.1 \times R_L$ ohm., where $R_L$ is the impedance of the remainder of the circuit which is in series with the device; $R_{dn}$ is preferably less than $0.04 \times R_L$, particularly less than $0.001 \times R_L$. $R_L$ is preferably substantially constant, i.e. does not vary by more than ±25%, in the temperature range of operation of the circuit. $R_L$ will generally be a resistive load, but may be in whole or in part capacitive or inductive. However, if $R_L$ does vary substantially over the temperature range of operation, the device can protect the circuit against excessive variations of $R_L$, by protecting against excessive current resulting from a reduction in $R_L$ and/or against excessive generation of heat resulting from an increase in $R_L$.

As will be appreciated from the above, the power of the device in the normal operating condition of the circuit will be very low and will be readily dissipated to the environment. On the other hand, when a fault condition develops, the electrical power of the device must first increase rapidly so that the power cannot be dissipated to the environment and then decrease until a high temperature stable equilibrium point is reached at which the power can be dissipated and the resistance of the device is sufficiently high to ensure that the circuit is "shut off", i.e. the current in the circuit is reduced to an appropriately low level. Since the electrical power of the device is dependent both on its resistance (which is dependent on its temperature) and the current passing through it, the device will shut off the circuit in response to an excessive temperature around the device or an excessive current in the circuit (or of course a combination of both). We have found that in order to reduce the current to the levels which are required in practical applications, the Switching Ratio, i.e. the ratio of the power in the circuit at the normal operating condition to the power of the circuit in the shut-off condition, must be at least 10, and is preferably substantially higher, for example at least 20, preferably at least 40, particularly at least 100.

Many of the devices of the invention can be used to protect circuits against both excessive environmental temperatures and excessive currents. On the other hand, for optimum performance, the details of the device and its thermal environment should be selected with a view to the expected fault condition, and there are some circuits and environments in which a given device will function in accordance with the invention in response to an excessive increase in current, but not in response to an undesirable increase in environmental temperature, and vice versa. The devices are particularly useful in circuits which have a current greater than 0.5 amp, e.g. 0.5 to 4 amp, preferably 0.5 to 2.5 amp, in the normal operating condition, and can be designed to pass steady state currents of up to 15 amps or even more.

The operation of the device can most easily be explained by reference to FIGS. 1 to 4 of the accompanying drawings. FIG. 1 shows the relationship between resistance and temperature of a typical device. FIG. 2 shows a typical circuit of the invention having a source of electrical power, a resistive load $R_L$ and a PTC protection device $R_d$. FIG. 3 shows the relationship between the power and the temperature of the device when the electrical circuit remains unchanged except for changes in the resistance of the device as a result of changes in environmental temperature and $I^2R$ heating. FIG. 3 also shows representative load lines A1, A2, A3, A4, B1, B2, B3 and B4 which indicate the power which the device can dissipate by thermal losses under different conditions. The slope of these lines (which are approximately straight when the difference between the temperature of the device and the temperature of the medium surrounding the device is less than 100° C., as it usually will be) is dependent on the thermal conductivity of the medium surrounding the device, the movement (if any) of the medium and the surface area of the device, and their position is dependent on the temperature of the medium surrounding the device. Thus load lines A1, A2, A3 and A4 are representative of a first device in a first medium at increasing temperatures of the medium, $T_1$, $T_2$, $T_3$ and $T_4$; while load lines B1, B2, B3 and B4 are representative of, for example, (a) the same device in a second medium which has a lower thermal conductivity then the first medium, or (b) a second device which has the same power temperature curve as the first device, but which has a smaller surface area than the first device, and which is in the first medium.

When the device has load lines A1, A2, A3 and A4, then so long as the temperature of the medium is below $T_3$, the device will be in stable equilibrium. However, when the temperature of the medium reaches the critical temperature, $T_3$ (which is the temperature referred to as $T_{crit}$), at which point the device is at $T_{d\ trip\ A}$, the equilibrium becomes unstable, and any further increase in the temperature of the medium forces the power of the device over the peak of the P/T curve until a high temperature stable equilibrium point is reached. If, for example, the temperature of the medium increases only very slightly, then a stable equilibrium will be reached at the point at which the load line A3 intersects the power-temperature curve beyond the peak of the curve, i.e. when the device is at a temperature $T_{d\ latch\ A}$. If the temperature of the medium continues to increase to $T_4$, then equilibrium will be reached when the device is at a higher temperature, $T_{d\ latch\ A4}$. It will be seen that once the device has been forced into the high resistance, high temperature, stable equilibrium state, then it will not revert to its low resistance state (i.e. it will continue to prevent substantial current flowing in the circuit) unless the temperature of the medium falls below the temperature $T_2$, which is substantially below the temperature of the medium, $T_{crit}$, which caused the device to trip in the first place. Hence the device is said to be in a "latched" condition. The device can also be forced to re-set, i.e. to revert to its low resistance state, by greatly increasing the rate at which the device will lose heat to its surroundings. In general, however, the devices of the invention are designed and operated so that, if latching of the device occurs, re-setting is achieved by switching off the current and allowing the device to cool.

The operation of a device having load lines B1, B2, B3 and B4 can be similarly explained. It will be seen that for these load lines, the device will be tripped when the temperature of the medium surrounding the device reached $T_2$ (which is substantially below $T_3$) at which the temperature of the device is $T_{d\ trip\ B}$ (which is substantially below $T_{trip\ A}$).

FIG. 4 shows representative power/temperature curves P and P¹ and load lines A and B for a typical device of the invention. P is the power/temperature curve of the device when the electrical circuit remains unchanged except for changes in the resistance of the device due to changes in environmental temperature and/or $I^2R$ heating. Under normal operating conditions, with an environmental temperature T, the temperature of the device will be $T_{dA}$ if the device has load line A and $T_{dB}$ if the device has load line B. P¹ is the power/temperature curve of the device at a current which is very much higher than the current at the normal operating condition. If an electrical fault, e.g. a short circuit of $R_L$ or a voltage surge, causes the current through the device to increase sharply, then the power of the device will almost instantaneously become $P_A$ if the device has load line A and $P_B$ if the device has load line B. Thus the power of the device rises to a very high level and then declines as the temperature (and, therefore, the resistance) of the device increases, until equilibrium is reached when the load line intersects the power/temperature curve. It may be noted that if the device has load line A, removal of the short circuit will cause the circuit to revert to its previous normal operating condition with the device at $T_{dA}$. On the other hand, if the device has load line B, the device is latched, i.e. removal of the short circuit will merely cause a small reduction in the temperature of the device to $T_{dB}$, and a correspondingly small reduction in the power of the device, and will not restore the previous normal operating conditions.

In many of the important uses for devices of the present invention, it is important that the device should continue to operate in substantially the same way over more or less extended periods of time, even when aging takes place with the device in the high resistance, high temperature state. In preferred circuits of the invention, the device, after said circuit has been subjected to an aging treatment which consists of operating the circuit for 10 hours with said device at said high temperature equilibrium point, switching the current off, allowing the device to cool to substantially below $T_{dn}$ and reducing the temperature of the medium to substantially below $T_n$, has an electrical power/temperature relationship such that the circuit has a normal operating condition as defined; reaches an unstable equilibrium point as defined when the medium is heated slowly from $T_n$, at which unstable equilibrium point the medium has a temperature $T_{crit/10}$ which is between $(T_{crit}-20)°C$. and $(T_{crit}+10)°C$., preferably between $(T_{crit}-5)°C$. and $(T_{crit}+5)°C$.; and reaches a high temperature stable equilibrium point as defined when the medium is heated above $T_{crit/10}$. It is also preferred that the device, after said aging treatment, has a resistance in the normal operating condition of the aged circuit, $R_{dn/10}$ between $0.5 \times R_{dn}$ and $3 \times R_{dn}$, preferably between $0.7 \times R_{dn}$ and $1.5 \times R_{dn}$. Where it is expected that the device will spend long periods in the tripped condition, it is preferred that there should be a similar maintenance of the properties of the device after 100 hours of aging as specified above.

We have also found that the devices have improved uniformity of performance if the device is such that at each temperature between $T_n$ and $T_{d\,trip}$ the value of the quantity $$(1/R) \times (dR/dT)$$

where R is the resistance of the device in ohms and T is the temperature of the device, does not change by more than ±50%, preferably by not more than ±25%, when the device is subjected to an aging treatment which consists of operating the circuit for 10 hours, preferably 100 hours with said device at said high temperature equilibrium point, switching off the current, and allowing the device to cool to substantially below $T_{dn}$.

The way in which the device operates is in part dependent on the rate at which heat can be removed from it. This rate will depend on the heat transfer coefficient of the device, and we have found that in general the device should have a heat transfer coefficient, measured in still air and averaged over the total surface area of the device, of 2.5 to 5 milliwatts/deg C.cm². The optimum thermal design of the device will depend upon the fault condition against which it is to protect. In most cases, the device should react as quickly as possible to the fault condition. Thus a device which is intended to protect against a thermal overload should preferably be in good thermal contact with the medium which surrounds it, whereas a device which is intended to protect against excessive current should preferably be relatively well thermally insulated. For protection against thermal overloads, the device should be thermally coupled to the place where the excessive heat will be created.

The circuit protection devices of the invention will generally comprise an electrically insulating jacket which surrounds the PTC element and the electrodes and through which pass the leads to the electrodes. This jacket will also affect the thermal properties of the device, and its thickness will be selected accordingly. Preferably the device comprises an oxygen barrier layer as described in the copending application of Middleman et al referred to above.

The circuits of the invention may contain another circuit protection device, e.g. a conventional thermostat or a bimetal switch, which may be intended to protect the circuit against the same fault condition as the PTC device of a different one. Where the conventional device and the PTC device are intended to protect against the same fault condition, the PTC device will usually be such that it comes into operation only if the other device fails. The power supply may be a DC supply, e.g. one or more 12 volt batteries, or an AC supply, e.g. 110 volts or 220 volts.

Referring now to FIGS. 5 and 6, these are cross-sectional views of devices of the invention. The device of FIG. 5 comprises a PTC element 1 in the form of a round disc having round mesh electrodes 2 embedded in opposite faces thereof; leads 4 are attached to the electrodes 2; and oxygen barrier layer 3 encapsulates the PTC element 1 and the electrodes 2, with leads 4 passing through it. The interface between the barrier layer 3 and the PTC element 1 is substantially free from large voids. The device of FIG. 6 is the same as the device of FIG. 5, except that each of the electrodes is embedded in a layer 5 of a relatively constant wattage conductive polymer composition.

Referring now to FIGS. 7 and 8, these show, respectively, a view of an aquarium heater comprising a circuit protection device according to the invention and a circuit diagram for the aquarium heater. A circuit protection device 11 as shown in FIG. 5 is connected in series with a wire-wound heater 12 which comprises resistance heating wires 121 wound about a hollow ceramic core 122, and a bimetal thermostat 13 which is set by means of knurled knob 131 to open when the temperature of the air around it exceeds a temperature in the range of 25° to 45° C. Capacitor 132 is connected in parallel with thermostat 13. Plug 15 enables the heater 12 to be connected to a 120 volt AC power supply (not shown). Lamp 16 and resistor 17 (not shown in FIG. 7) are connected in parallel with heater 12 and device 11, so that lamp 16 is lit when AC power is being supplied via plug 15. Lamp 18 and resistor 19 are connected in parallel with device 11 so that lamp 18 is lit when the device is in the high temperature equilibrium state, but not when the aquarium heater is in the normal operating condition. The various components referred to above are secured to a molded plastic cap 20 having a downwardly extending frame portion 201 so that they can be inserted into tubular glass case 21, to the top of which is secured molded plastic part 22 which mates with cap 20 and in the bottom of which is glass wool 14. Also secured to glass case 21 is protective molded plastic ring 23.

The aquarium heater of FIGS. 7 and 8 is the same as a known aquarium heater except for the addition of device 11, lamp 18 and resistor 19.

When the bottom portion of the aquarium heater of FIGS. 7 and 8 is immersed in water and is then connected to a 120 volt AC power supply, the heat generated by heater 12 is dissipated to the water so that the thermostat 13 cycles between the open and closed positions in response to the temperature of the air around it and the device 11 remains in a low resistance state. If the heater is removed from the water, the air within the glass case is heated rapidly, and providing that the thermostat 13 is operating correctly, it will open so that current no longer flows in the circuit and device 11 will remain in a low resistance state. However, bimetal thermostats are not wholly reliable, and if they fail, they often fail in the closed position. Thus the known heaters, which do not incorporate device 11, can, if the thermostat fails, overheat the glass case, so that the case cracks when it is re-immersed in water, and can even cause fires. However, in the aquarium heater of FIGS. 7 and 8, if the bimetal thermostat fails, then the air within the case will continue to increase in temperature until the device 11 is caused to trip, thus reducing the circuit current to a very low level at which heater 12 does not generate significant heat.

The invention is illustrated in the following Examples.

EXAMPLE 1

A circuit protection device as shown in FIG. 5 was prepared using the procedure described in Example 2 of the Middleman et al. application entitled PTC Devices Comprising Oxygen Barrier Layers referred to above. The device comprised a PTC element in the form of a disc of diameter (d) 0.75 inch and thickness 0.08 inch, with an electrode of nickel-plated copper mesh embedded in each face, giving an effective thickness between the electrodes (t) of about 0.06 inch (i.e. d/t about 12). The PTC element was composed of a dispersion of carbon black in a blend of high density polyethylene and an ethylene/acrylic acid copolymer. The resistance of the device was about 0.1 ohm at 25° C., and the device had a maximum pass current ($I_{max}$) of about 2.5 amps (with the device in still air at 25° C.)

The device was incorporated into an aquarium heater as shown in FIG. 7, which was then placed in water and connected to a 120 volt AC power supply. The resistance of the wire-wound heater was 144 ohms. With the bottom portion of the aquarium heater in the water, i.e. under normal operating conditions, the current in the circuit was 0.83 amps, the temperature of the device ($T_{dn}$) was less than 50° C. and the resistance of the device ($R_{dn}$) was less than 0.2 ohm. The aquarium heater was removed from the water and placed in air, and the thermostat was permanently secured in the closed position to simulate failure thereof. The heat generated by the wire-wound heater caused the temperature inside the glass case to rise rapidly to about 80° C. ($T_{crit}$) at which point the resistance of the device $R_{d\ trip}$ was about 0.3 ohm, the temperature of the device ($T_{d\ trip}$) was about 90° C., and the rate at which the device generated heat by $I^2R$ heating exceeded the rate at which the device could dissipate heat. The temperature of the device then rose rapidly until the high temperature stable equilibrium point was reached, at which the device could dissipate the heat generated by $I^2R$ heating. At this point the device had a temperature ($T_{d\ latch}$) of about 125° C. and a resistance ($R_{d\ latch}$) of about 7,200 ohms, and the circuit current was about 0.02 amp, so that the wire-wound heater no longer generated any significant amount of heat. The Switching Ratio was about 50. The device was in the latched condition, so that the current in the circuit remained extremely low, even though the wire-wound heater was no longer generating heat. By switching off the current and allowing the device to cool to room temperature, the aquarium heater was restored to its original condition.

EXAMPLE 2

A device as described in Example 1 was placed in a circuit consisting of the device, a resistor of 144 ohms in series with the device, and 120 volt AC power supply. This circuit, which was substantially the same electrically as the circuit used in Example 1, had a similar normal operating condition. A short circuit was placed around the resistor, so that the load in series with the device was reduced to 1 ohm, thus increasing the current to about 120 amps. The power of the device rose to about 1500 watts almost instantaneously and then decreased, as the device became hot and its resistance increased, until the high temperature equilibrium point was reached. As in Example 1, the Switching Ratio was about 50 and the device was in the latched condition.

We claim:

1. An electrical circuit which comprises
   (1) a source of electrical power;
   (2) a circuit protection device comprising at least two electrodes and a PTC element composed of a PTC composition having a switching temperature $T_s$; and
   (3) other circuit elements which are connected in series with said PTC element and which have an impedance $R_L$ ohms;

said electrical circuit having a normal operating condition in which
   (A) current flows through said PTC element over an area of equivalent diameter d with an average path length t such that d/t is at least 2;
   (B) said device is at a temperature $T_{dn}$ at which the device has a resistance $R_{dn}$ which is
      (a) less than 1 ohm; and
      (b) less than $0.1 \times R_L$ ohm, and at which said PTC composition has a resistivity of less than 10 ohm.cm.;
   (C) said device is in contact with a medium which is at a temperature $T_n$; and
   (D) there is a stable equilibrium between the rate at which the device generates heat by $I^2R$ heating and the rate at which heat is lost from the device;

and said device having an electrical power/temperature relationship and being capable of losing heat to said medium at a rate such that
   (a) if said medium is heated slowly from $T_n$ while maintaining $R_L$ and the voltage of the source of electrical power substantially constant, the temperature of the device increases slowly until the equilibrium between the rate at which the device generates heat by $I^2R$ heating and the rate at which heat is lost from the device becomes unstable, at which unstable equilibrium point the medium is at a temperature $T_{crit}$, the device is at a temperature $T_{d\ trip}$ and has a resistance $R_{d\ trip}$, and the rate at which the resistance of the device changes with temperature, $dR_{d\ trip}/dT_{d\ trip}$ is positive; and
   (b) if said medium is then heated just above $T_{crit}$, the rate at which the device generates heat by $I^2R$ heating exceeds the rate at which heat can be lost from the device and thus causes the temperature and the resistance of the device to rise rapidly and the circuit current to fall until a high temperature stable equilibrium point is reached at which the rate at which the device generates heat by $I^2R$ heating is equal to the rate at which heat is lost from the device; at which high temperature stable equilibrium point, the device is at a temperature $T_{d\ latch}$ and has a resistance $R_{d\ latch}$ which is such that the ratio of the power in the circuit in the normal operating condition to the power in the circuit at said high temperature stable equilibrium point, the Switching Ratio, is at least 10.

2. A circuit according to claim 1 wherein said PTC element is composed of a conductive polymer.

3. A circuit according to claim 2 wherein said conductive polymer contains conductive carbon black.

4. A circuit according to claim 2 wherein said conductive polymer will withstand a voltage stress of at least 200 volts/millimeter at $T_{d\ latch}$.

5. A circuit according to claim 2 wherein said conductive polymer has a resistivity at $T_{dn}$ of less than 7 ohm. cm.

6. A circuit according to claim 2 wherein said device has a resistance at $T_{dn}$ of less than 0.2 ohm.

7. A circuit according to claim 2 wherein said ratio d/t is at least 10.

8. A circuit according to claim 2 wherein $R_{dn}$ is at most $0.01 \times R_L$.

9. A circuit according to claim 2 wherein the Switching Ratio is at least 40.

10. A circuit according to claim 9 wherein the Switching Ratio is at least 100.

11. A circuit according to claim 2 wherein $R_{d\ latch}$ is less than the resistance of the device at all temperatures between $T_{d\ latch}$ and $(T_{d\ latch}+10)°C$.

12. A circuit according to claim 11 wherein $R_{d\ latch}$ is less than the resistance of the device at all temperatures between $T_{d\ latch}$ and $(T_{d\ latch}+50)°C$.

13. A circuit according to claim 2 wherein the device has a resistance at a temperature above $T_{d\ latch}$ which is at least 10 times $R_{d\ latch}$.

14. A circuit according to claim 2 wherein said device, after said circuit has been subjected to an aging treatment which consists of operating the circuit for 10 hours with said device at said high temperature equilibrium point, switching the current off, allowing the device to cool to substantially below $T_{dn}$ and reducing the temperature of the medium to substantially below $T_n$, has an electrical power/temperature relationship such that the circuit has a normal operating condition as defined, reaches an unstable equilibrium point as defined when the medium is heated slowly from $T_n$, at which unstable equilibrium point the medium has a temperature $T_{crit/10}$ which is between $(T_{crit}-20)°C$. and $(T_{crit}+10)°C$.; and reaches a stable equilibrium point as defined when the medium is heated above $T_{crit/10}$.

15. A circuit according to claim 14 wherein $T_{crit/10}$ is between $(T_{crit}-5)°C$. and $(T_{crit}+5)°C$.

16. A circuit according to claim 14 wherein said device, after said aging treatment, has a resistance in said normal operating condition, $R_{dn/10}$, between $0.5 \times R_{dn}$ and $3 \times R_{dn}$.

17. A circuit according to claim 16 wherein $R_{dn/10}$ is between $0.7 \times R_{dn}$ and $1.5 \times R_{dn}$.

18. A circuit according to claim 14 wherein said device, after said circuit has been subjected to an aging treatment which consists of operating the circuit for 100 hours with said device at said high temperature equilibrium point, switching the current off, allowing the device to cool to substantially below $T_{dn}$ and reducing the temperature of the medium to substantially below $T_n$, has an electrical power/temperature relationship such that the circuit has a normal operating condition as defined; reaches an unstable equilibrium point when the medium is heated slowly from $T_n$, at which unstable equilibrium point the medium has a temperature $T_{crit/100}$ which is between $(T_{crit}-20)°C$. and $(T_{crit}+10)°C$.; and reaches a stable equilibrium point as defined when the medium is heated above $T_{crit/100}$.

19. A circuit according to claim 18 wherein $T_{crit/100}$ is between $(T_{crit}-5)°C$. and $(T_{crit}+5)°C$.

20. A circuit according to claim 18 wherein said device, after said aging treatment, has a resistance in said normal operating condition, $R_{dn/100}$, between $0.5 \times R_{dn}$ and $3 \times R_{dn}$.

21. A circuit according to claim 2 wherein the heat transfer coefficient of said device, measured in still air, is 2.5 to 5 milliwatts per deg C per cm².

22. A circuit according to claim 2 wherein said device is such that at each temperature between $T_n$ and $T_{d\ trip}$ the value of the quantity $$(1/R) \times dR/dT$$

where R is the resistance of the device in ohms and T is the temperature of the device, does not change by more than ±50% when the device is subjected to an aging treatment which consists of operating the circuit for 100 hours with said device at said high temperature equilibrium point, switching off the current, and allowing the device to cool to substantially below $T_{dn}$.

23. A circuit according to claim 22 wherein said quantity does not change by more than ±25%.

24. A circuit protection device which comprises a PTC element composed of a PTC composition having a switching temperature $T_s$ and at least two electrodes which can be connected to a source of electrical power and which, when so connected, cause current to flow through said PTC element; said device being such that a test circuit which consists of said device, a source of power having a voltage selected from 10 volts and 100 volts and a resistor of selected resistance in series with said device, said device being in still air and said resistance being selected so that when the air is at 25° C. there is an unstable equilibrium between the rate at which the device generates heat by $I^2R$ heating and the rate at which heat is lost from the device, has a stable operating condition in which (A) current flows through said PTC element over an area of equivalent diameter d with an average path length t such that d/t is at least 2;

(B) said device is at a temperature $T_{dn}$ at which the device has a resistance $R_{dn}$ less than 1 ohm and at which said PTC composition has a resistivity of less than 10 ohm. cm.;

(C) the air is at a temperature $T_n$ which is less than 25° C.; and (D) there is a stable equilibrium between the rate at which the device generates heat by $I^2R$ heating and the rate at which heat is lost from the device;

and said device in said test circuit having an electrical power/temperature relationship and being capable of losing heat to the air at a rate such that (a) if the air is heated slowly from $T_n$ while maintaining said resistor and said source of power substantially constant, the temperature of the device increases slowly until the equilibrium between the rate at which the device generates heat by $I^2R$ heating and the rate at which heat is lost from the device becomes unstable, at which unstable equilibrium point the air is at a temperature of 25° C., the device is at a temperature $T_{d\,trip}$ and has a resistance $R_{d\,trip}$, and the rate at which the resistance of the device changes with temperature, $dR_{d\,trip}/dT_{d\,trip}$ is positive; and (b) if the air is then heated just above 25° C., the rate at which the device generates heat by $I^2R$ heating exceeds the rate at which heat can be lost from the device and thus causes the temperature and the resistance of the device to rise rapidly and the circuit current to fall until a high temperature stable equilibrium point is reached at which the rate at which the device generates heat by $I^2R$ heating is equal to the rate at which heat is lost from the device; at which high temperature stable equilibrium point, the device is at a temperature $T_{d\,latch}$ and has a resistance $R_{d\,latch}$ which is such that the ratio of the power in the circuit in the stable operating condition to the power in the circuit at said high temperature stable equilibrium point, the Switching Ratio, is at least 10.

25. A device according to claim 24 wherein said PTC element is composed of a conductive polymer.

26. A device according to claim 25 wherein said conductive polymer contains conductive carbon black.

27. A device according to claim 25 wherein said conductive polymer will withstand a voltage stress of at least 200 volts/millimeter at $T_{d\,latch}$.

28. A device according to claim 25 wherein said conductive polymer has a resistivity at $T_{dn}$ of less than 7 ohm cm.

29. A device according to claim 25 wherein said device has a resistance at $T_{dn}$ of less than 0.2 ohm.

30. A device according to claim 25 wherein said ratio d/t is at least 10.

31. A device according to claim 25 wherein $R_{dn}$ is at most 0.1 times the resistance of said resistor.

32. A device according to claim 25 wherein said source of power has a voltage of 100 volts and $R_{dn}$ is at most 0.01 times the resistance of said resistor.

33. A device according to claim 25 wherein said source of power has a voltage of 100 volts and the Switching Ratio is at least 60.

34. A device according to claim 33 wherein the Switching Ratio is at least 100.

35. A device according to claim 25 wherein $R_{d\,latch}$ is less than the resistance of the device at all temperatures between $T_{d\,latch}$ and $(T_{d\,latch}+10)$°C.

36. A device according to claim 35 wherein $R_{d\,latch}$ is less than the resistance of the device at all temperatures between $T_{d\,latch}$ and $(T_{d\,latch}+50)$°C.

37. A device according to claim 25 wherein the device has a resistance at a temperature above $T_{d\,latch}$ which is at least $10 \times R_{d\,latch}$.

38. A device according to claim 25 which, after said circuit has been subjected to an aging treatment which consists of operating the circuit for 10 hours with said device at said high temperature equilibrium point, switching the current off, allowing the device to cool to substantially below $T_{dn}$ and reducing the temperature of the medium to substantially below $T_n$, has an electrical power/temperature relationship such that the circuit has a operating condition as defined; reaches an unstable equilibrium point as defined when the medium is heated slowly from $T_n$, at which unstable equilibrium point the medium has a temperature $T_{crit/10}$ which is between 5 and 35° C.; and reaches a high temperature stable equilibrium point as defined when the medium is heated above $T_{crit/10}$.

39. A device according to claim 38 such that $T_{crit/10}$ is between 20° and 30° C.

40. A device according to claim 38 which, after said aging treatment, has a resistance in said stable operating condition, $R_{dn/10}$, between $0.5 \times R_{dn}$ and $3 \times R_{dn}$.

41. A device according to claim 40 whose $R_{dn/10}$ is between $0.7 \times R_{dn}$ and $1.5 \times R_{dn}$.

42. A device according to claim 38 which, after said circuit has been subjected to an aging treatment which consists of operating the circuit for 100 hours with said device at said high temperature equilibrium point, switching the current off, allowing the device to cool to substantially below $T_{dn}$ and reducing the temperature of the medium to substantially below $T_n$, has an electrical power/temperature relationship such that the circuit has a stable operating condition as defined; reaches an unstable equilibrium point when the medium is heated slowly from $T_n$, at which unstable equilibrium point the medium has a temperature $T_{crit/100}$ which is between 5° and 35° C.; and reaches a high temperature stable equilibrium point as defined when the medium is heated above $T_{crit/100}$.

43. A device according to claim 42 such that $T_{crit/100}$ is between 20° and 30° C.

44. A device according to claim 42 which, after said aging treatment, has a resistance in said normal operating condition, $R_{dn/100}$, between $0.5 \times R_{dn}$ and $3 \times R_{dn}$.

45. A device according to claim 25 whose heat transfer coefficient, measured in still air, is 2.5 to 5 milliwatts per deg C per cm$^2$.

46. A device according to claim 25 whose resistance/temperature curve in said circuit is such that at each temperature between $T_n$ and $T_{d\,trip}$, the value of the quantity $$(1/R) \cdot dR/dT$$

where R is the resistance of the device in ohms and T is the temperature of the device does not change by more than ±50% when the device is subjected to an aging treatment which consists of operating said circuit for 100 hours with said device at said high temperature equilibrium point, switching off the current, and allowing the device to cool to substantially below $T_{dn}$.

47. A device according to claim 46 wherein said quantity does not change by more than ±25%.

48. An electrical circuit which comprises
 (1) a source of electrical power;
 (2) a circuit protection device comprising at least two electrodes and a PTC element composed of a PTC composition having a switching temperature $T_s$; and
 (3) other circuit elements which are connected in series with said PTC element and which have an impedance $R_L$ ohms; said electrical circuit having a normal operating condition in which
 (A) a current $i_n$ flows through said PTC element over an area of equivalent diameter d with an average path length t such that d/t is at least 2;

(B) said device is at a temperature $T_{dn}$ at which the device has a resistance $R_{dn}$ which is
  (a) less than 1 ohm; and
  (b) less than $0.1 \times R_L$ ohm, and at which said PTC composition has a resistivity of less than 10 ohm. cm.;
(c) said device is in contact with a medium which is at a temperature $T_n$; and
(D) there is a stable equilibrium between the rate at which the device generates heat by $I^2R$ heating and the rate at which heat is lost from the device;

and said device having an electrical power/temperature relationship and being capable of losing heat to said medium at a rate such that
  (a) if elements of the circuit are changed so that the current flowing through said device increases slowly from $i_n$ while maintaining $T_n$ substantially constant, the temperature of the device increases slowly until the equilibrium between the rate at which the device generates heat by $I^2R$ heating and the rate at which heat is lost from the device becomes unstable, at which unstable equilibrium point the current is at a value $i_{crit}$ and the rate at which the resistance of the device changes with temperature is positive; and
  (b) if elements of the electrical circuit are further changed so that the current flowing through said device increases to $2 \times i_{crit}$, while maintaining $T_n$ substantially constant, the rate at which the device generates heat by $I^2R$ heating exceeds the rate at which heat can be lost from the device and thus causes the temperature and the resistance of the device to rise rapidly and the circuit current to fall until a high temperature stable equilibrium point is reached at which the rate at which the device generates heat by $I^2R$ heating is equal to the rate at which heat is lost from the device; at which high temperature stable equilibrium point, the device has a resistance such that the ratio of the power in the circuit in the normal operating condition to the power in the circuit at said high temperature stable equilibrium point, the Switching Ratio, is at least 10.

49. A circuit according to claim 48 wherein said stable equilibrium point is such that if the elements of the electrical circuit are restored to their original condition, while continuing to pass current through the circuit, the current which flows in the restored circuit is substantially lower than $i_n$.

50. A circuit according to claim 48 wherein said PTC element is composed of a conductive polymer.

51. A circuit according to claim 50 wherein said conductive polymer contains conductive carbon black.

52. A circuit according to claim 50 wherein said conductive polymer will withstand a voltage stress of at least 200 volts/millimeter at said high temperature stable equilibrium point.

53. A circuit according to claim 50 wherein said conductive polymer has a resistivity of less than 7 ohm. cm. in said normal operating condition.

54. A circuit according to claim 50 wherein said device has a resistance of less than 0.2 ohm. in said normal operating condition.

55. A circuit according to claim 50 wherein said ratio d/t is at least 10.

56. A circuit according to claim 50 wherein $R_{dn}$ is at most $0.01 R_L$.

57. A circuit according to claim 50 wherein the Switching Ratio is at least 40.

58. A circuit according to claim 57 wherein the Switching Ratio is at least 100.

59. A circuit according to claim 50 wherein the device has a resistance at a temperature above its temperature at said high temperature stable equilibrium point which is at least 10 times its resistance at said equilibrium point.

60. A circuit according to claim 50 wherein said device, after said circuit has been subjected to an aging treatment which consists of operating the circuit for 10 hours with said device at said high temperature equilibrium point, switching the current off, allowing the device to cool to substantially below $T_{dn}$ and reducing the temperature of the medium to substantially below $T_s$, has an electrical power/temperature relationship such that the circuit has a normal operating condition as defined and the device has a resistance in said normal operating condition $R_{dn/10}$, between $0.5 \times R_{dn}$ and $3 \times R_{dn}$.

61. A circuit according to claim 60 wherein $R_{dn/10}$ is between $0.7 \times R_{dn}$ and $1.5 \times R_{dn}$.

62. A circuit according to claim 60 wherein said device, after said circuit has been subjected to an aging treatment which consists of operating the circuit for 100 hours with said device at said high temperature equilibrium point, switching the current off, allowing the device to cool to substantially below $T_{dn}$ and reducing the temperature of the medium to substantially below $T_n$, has an electrical power/temperature relationship such that the circuit has a normal operating condition as defined and the device has a resistance in said normal operating condition, $R_{dn/100}$, between $0.5 \times R_{dn}$ and $3 \times R_{dn}$.

63. A circuit according to claim 62 wherein $R_{dn/100}$ is between $0.7 \times R_{dn}$ and $1.5 \times R_{dn}$.

* * * * *